United States Patent
Kim et al.

(10) Patent No.: US 6,897,274 B2
(45) Date of Patent: May 24, 2005

(54) PREPOLYMERIZATION METHOD OF α-OLEFIN

(75) Inventors: Yoo-Kyoung Kim, Seosan-shi (KR); Kun Lo, Seosan-shi (KR); Il-Seop Kim, Taejon-shi (KR)

(73) Assignee: Samsung Atofina Co., Ltd., ChungNam (KR)

( * ) Notice: Subject to any disclaimer, the term of this patent is extended or adjusted under 35 U.S.C. 154(b) by 0 days.

(21) Appl. No.: 10/416,399

(22) PCT Filed: Oct. 18, 2001

(86) PCT No.: PCT/KR01/01757

§ 371 (c)(1),
(2), (4) Date: Oct. 16, 2003

(87) PCT Pub. No.: WO02/38622

PCT Pub. Date: May 16, 2002

(65) Prior Publication Data

US 2004/0063571 A1 Apr. 1, 2004

(30) Foreign Application Priority Data

Nov. 9, 2000 (KR) .................................... 2000-0066411

(51) Int. Cl.⁷ .................................................. C08F 4/42
(52) U.S. Cl. ............................... 526/124.3; 526/124.2; 526/348; 526/123.1; 526/151; 502/103; 502/115; 502/113
(58) Field of Search .......................... 526/348, 123.1, 526/124.3, 124.2, 151; 2/103, 115, 113

(56) References Cited

U.S. PATENT DOCUMENTS

| | | |
|---|---|---|
| 3,332,927 A | 7/1967 | Cottingham |
| 3,632,620 A | 1/1972 | Kober et al. |
| 3,642,746 A | 2/1972 | Kashiwa et al. |
| 3,642,772 A | 2/1972 | Haid et al. |
| 3,878,124 A | 4/1975 | Durand et al. |
| 3,899,477 A | 8/1975 | Altemore et al. |
| 3,953,414 A | 4/1976 | Galli et al. |
| 4,013,823 A | 3/1977 | Longi et al. |
| 4,069,169 A | 1/1978 | Toyota et al. |
| 4,071,672 A | 1/1978 | Kashiwa |
| 4,071,674 A | 1/1978 | Kashiwa et al. |
| 4,076,924 A | 2/1978 | Toyota et al. |
| 4,085,276 A | 4/1978 | Toyota et al. |
| 4,107,413 A | 8/1978 | Giannini et al. |
| 4,107,414 A | 8/1978 | Giannini et al. |
| 4,107,415 A | 8/1978 | Giannini et al. |
| 4,111,835 A | 9/1978 | Foschini et al. |
| 4,148,756 A | 4/1979 | Langer, Jr. |
| 4,156,063 A | 5/1979 | Giannini et al. |
| 4,157,435 A | 6/1979 | Toyota et al. |
| 4,158,642 A | 6/1979 | Langer, Jr. |
| 4,187,196 A | 2/1980 | Giannini et al. |
| 4,220,554 A | 9/1980 | Scata et al. |
| 4,226,963 A | 10/1980 | Giannini et al. |
| 4,235,747 A | 11/1980 | Leung |
| 4,263,169 A | 4/1981 | Scatt et al. |
| 4,277,372 A | 7/1981 | Matlack |
| 4,315,835 A | 2/1982 | Scatt et al. |
| 4,315,874 A | 2/1982 | Ushida et al. |
| 4,330,649 A | 5/1982 | Kioka et al. |
| 4,336,360 A | 6/1982 | Giannini et al. |
| 4,355,143 A | 10/1982 | Lassalle et al. |
| 4,380,507 A | 4/1983 | Noristi et al. |
| 4,390,671 A | 6/1983 | Imai et al. |
| 4,399,054 A | 8/1983 | Ferraris et al. |
| 4,401,589 A | 8/1983 | Kioka et al. |
| 4,417,019 A | 11/1983 | Yamamoto et al. |
| 4,434,282 A | 2/1984 | Esneault |
| 4,439,540 A | 3/1984 | Cecchin et al. |
| 4,477,639 A | 10/1984 | Nielsen |
| 4,482,687 A | 11/1984 | Noshay et al. |
| 4,487,846 A | 12/1984 | Bailly et al. |
| 4,514,513 A | 4/1985 | Sato et al. |
| 4,518,706 A | 5/1985 | Gessell |
| 4,529,716 A | 7/1985 | Banzi et al. |
| 4,579,833 A | 4/1986 | Collomb et al. |
| 4,613,655 A | 9/1986 | Longi et al. |
| 4,614,727 A | 9/1986 | Longi et al. |
| 4,615,831 A | 10/1986 | Kanno et al. |
| 4,642,328 A | 2/1987 | Morterol et al. |
| 4,673,719 A | 6/1987 | Kioka et al. |
| 4,729,854 A | 3/1988 | Miyata et al. |
| 4,761,392 A | 8/1988 | Shiga et al. |
| 4,777,639 A | 10/1988 | Whitehouse |
| 4,806,433 A | 2/1989 | Sasaki et al. |
| 4,816,433 A | 3/1989 | Terano et al. |
| 4,829,037 A | 5/1989 | Terano et al. |
| 4,843,049 A | 6/1989 | Invernizzi et al. |
| 4,847,227 A | 7/1989 | Murai et al. |
| 4,847,639 A | 7/1989 | Sugata et al. |
| 4,866,022 A | 9/1989 | Arzoumanidis et al. |
| 4,912,074 A | 3/1990 | Miro |
| 4,946,816 A | 8/1990 | Cohen et al. |
| 4,952,649 A | 8/1990 | Kioka et al. |
| 4,962,167 A | 10/1990 | Shiraishi et al. |

(Continued)

FOREIGN PATENT DOCUMENTS

| | | |
|---|---|---|
| DE | 2553104 | 6/1977 |
| DE | 3636060 | 5/1988 |
| EP | 0 008 307 | 3/1980 |

(Continued)

OTHER PUBLICATIONS

International Search Report PCT/KR01/01757, mailed Dec. 13, 2001.

*Primary Examiner*—Ling-Siu Choi
(74) *Attorney, Agent, or Firm*—Meyertons, Hood, Kivlin, Kowert & Goetzel, P.C.; Eric B. Meyertons

(57) ABSTRACT

The present invention relates to a method for the prepolymerization of α-olefin in the presence of a catalyst system which comprises (a) a magnesium supported solid complex titanium catalyst and (b) an organometallic compound of metal of Group I or III of the Periodic Table, characterized in that an inert solvent having high viscosity with molecular weight of 300 g/mole or more is used as a reaction medium.

6 Claims, 1 Drawing Sheet

U.S. PATENT DOCUMENTS

| | | |
|---|---|---|
| 4,970,186 A | 11/1990 | Terano et al. |
| 4,978,648 A | 12/1990 | Barb |
| 4,988,656 A | 1/1991 | Arzoumanidis et al. |
| 4,990,479 A | 2/1991 | Ishimaru et al. |
| 5,006,499 A | 4/1991 | Daire |
| 5,013,702 A | 5/1991 | Arzoumanidis et al. |
| 5,021,382 A | 6/1991 | Malpass, Jr. |
| 5,059,570 A | 10/1991 | Bailly et al. |
| 5,061,667 A | 10/1991 | Murata et al. |
| 5,064,798 A | 11/1991 | Chang |
| 5,081,090 A | 1/1992 | Arzoumanidis et al. |
| 5,104,838 A | 4/1992 | Fujita et al. |
| 5,106,807 A | 4/1992 | Morini et al. |
| 5,124,297 A | 6/1992 | Arzoumanidis et al. |
| 5,130,284 A | 7/1992 | Terano et al. |
| 5,134,104 A | 7/1992 | Sasaki et al. |
| 5,175,332 A | 12/1992 | Chatterton et al. |
| 5,182,245 A | 1/1993 | Arzoumanidis et al. |
| 5,218,052 A | 6/1993 | Cohen et al. |
| 5,244,996 A | 9/1993 | Kawasaki et al. |
| 5,346,872 A | 9/1994 | Menon et al. |
| 5,419,116 A | 5/1995 | Rast et al. |
| 5,438,110 A | 8/1995 | Ishimaru et al. |
| 5,439,995 A | 8/1995 | Bailly et al. |
| 5,455,316 A | 10/1995 | Tsutsui et al. |
| 5,459,116 A | 10/1995 | Ro et al. |
| 5,498,770 A | 3/1996 | Hoaska et al. |
| 5,502,128 A | 3/1996 | Flores et al. |
| 5,585,317 A | 12/1996 | Sacchetti et al. |
| 5,587,436 A | 12/1996 | Klimek et al. |
| 5,587,440 A | 12/1996 | Ehlers et al. |
| 5,618,886 A | 4/1997 | Shinozaki et al. |
| 5,629,390 A | 5/1997 | Nishimura et al. |
| 5,643,845 A | 7/1997 | Tajima et al. |
| 5,696,044 A | 12/1997 | Zakharov et al. |
| 5,726,261 A | 3/1998 | Sacchetti et al. |
| 5,780,378 A | 7/1998 | Toida et al. |
| 5,798,424 A | 8/1998 | Kong et al. |
| 5,817,591 A | 10/1998 | Shamshoum et al. |
| 5,844,046 A | 12/1998 | Ohgizawa et al. |
| 5,849,654 A | 12/1998 | Fushimi et al. |
| 5,849,655 A | 12/1998 | Shamshoum et al. |
| 5,869,418 A | 2/1999 | Iiskola et al. |
| 5,877,265 A | 3/1999 | Toida et al. |
| 5,880,056 A | 3/1999 | Tsutsui et al. |
| 5,936,049 A | 8/1999 | Kojoh et al. |
| 5,948,872 A | 9/1999 | Kioka et al. |
| 5,965,478 A | 10/1999 | Goto et al. |
| 5,968,862 A | 10/1999 | Abbott et al. |
| 6,028,149 A | 2/2000 | Luciani et al. |
| 6,034,025 A | 3/2000 | Yang et al. |
| 6,066,702 A | 5/2000 | Ro et al. |
| 6,111,038 A | 8/2000 | Kioka et al. |
| 6,114,276 A | 9/2000 | Kong et al. |
| 6,214,759 B1 | 4/2001 | Chang et al. |
| 6,218,331 B1 | 4/2001 | DiMaio et al. |
| 6,235,854 B1 | 5/2001 | Kioka et al. |
| 6,291,385 B1 | 9/2001 | Lee et al. |
| 6,323,150 B1 | 11/2001 | Kojoh et al. |
| 6,482,764 B1 | 11/2002 | Chang et al. |
| 6,521,560 B1 | 2/2003 | Kojoh et al. |
| 6,537,942 B2 | 3/2003 | Shinozaki et al. |
| 6,559,250 B2 | 5/2003 | Ro et al. |
| 2001/0031694 A1 | 10/2001 | Yang et al. |
| 2002/0037980 A1 | 3/2002 | Yang et al. |
| 2002/0045537 A1 | 4/2002 | Yang et al. |
| 2002/0120079 A1 | 8/2002 | Ro et al. |

FOREIGN PATENT DOCUMENTS

| | | |
|---|---|---|
| EP | 0131832 | 7/1984 |
| EP | 0350170 | 1/1990 |
| EP | 0385765 | 9/1990 |
| EP | 0 391 336 | 10/1990 |
| EP | 0602922 | 6/1994 |
| EP | 0606125 | 7/1994 |
| EP | 0 607 703 A1 * | 7/1994 |
| EP | 0 607 703 | 7/1994 |
| EP | 0607703 | 7/1994 |
| EP | 0669347 | 8/1995 |
| GB | 1335887 | 10/1973 |
| GB | 1492618 | 1/1975 |
| GB | 1577643 | 10/1980 |
| JP | 51136625 | 11/1976 |
| JP | 52111528 | 9/1977 |
| JP | 52-111528 | 9/1977 |
| JP | 59-064602 | 4/1984 |
| JP | 59-145206 | 8/1984 |
| JP | 59145206 | 8/1984 |
| JP | 61055103 | 3/1986 |
| JP | 61268704 | 11/1986 |
| JP | 62081405 | 4/1987 |
| JP | 63199703 | 8/1988 |
| JP | 63-199703 | 8/1988 |
| JP | 63-191811 | 9/1988 |
| JP | 63-54004 | 10/1988 |
| JP | 63308003 | 12/1988 |
| JP | 1242605 | 9/1989 |
| JP | 2240145 | 9/1990 |
| JP | 2-300206 | 12/1990 |
| JP | 06-340711 | 5/1993 |
| JP | 07-330675 | 8/1995 |
| JP | 7242706 | 9/1995 |
| JP | 8109215 | 4/1996 |
| JP | 9165478 | 6/1997 |
| JP | 09176226 | 7/1997 |
| JP | 2000191845 | 7/2000 |
| KR | 1020010084520 | 9/2001 |
| WO | WO 9844009 | 10/1998 |
| WO | WO 00/73355 | 12/2000 |
| WO | WO 01/32718 | 5/2001 |
| WO | WO 01/78687 | 10/2001 |
| WO | WO 02/38623 | 5/2002 |
| WO | WO 03/000747 | 1/2003 |

* cited by examiner

PREPOLYMERIZATION METHOD OF α-OLEFIN

TECHNICAL FILED

The present invention relates to a method for the prepolymerization of α-olefin in the presence of (a) a magnesium supported solid complex titanium catalyst and (b) an organometallic compound of metal of Group I or III of the Periodic Table, characterized in that an inert solvent having high viscosity with molecular weight of 300 g/mole or more is used as a reaction medium.

The present invention relates to a prepolymerization method which can be used in the uniform feeding of prepolymers with large diameter into a reactor, and thereby the present invention is useful when there is non-uniformity in concentration caused by precipitation of prepolymer due to its particle's large diameter, e.g, 100 μm or more, and when there is a plugging in a high pressure pump when it is fed into a small scale reactor such as in pilot scale.

DISCLOSURE OF INVENTION

The prepolymerization of α-olefin was conventionally conducted at room temperature using an inert liquid solvent with low molecular weight (100 g/mole or less) and low viscosity such as hexane and heptane as a reaction medium, and then the α-olefin prepolymer was fed in the reactor by using a pump after diluted into a slurry state in the storage drum. In this process, when the α-olefin prepolymer has a large diameter (100 μm or more), it precipitates within the storage drum and thereby varying its concentration Within the storage drum as the feeding time elapses. Further, when a commercial quantitative pump, which is typically in use for feeding a small amount of α-olefin prepolymer into a small scale reactor such as in pilot scale, is used, it induces a frequent abnormal feeding, because of its particle's large diameter e.g. 100 μm or more.

The present invention is directed to solve the above mentioned problems, and the purposes of the present invention are to provide a prepolymerization method of α-olefin which is capable of preventing abnormal feeding and improving reaction uniformity by conducting the reaction within a reaction medium with molecular weight of 300 g/mole or more and high viscosity such as mineral oil.

The prepolymerization method of α-olefin according to the present invention, which is conducted in the presence of a catalyst system which comprises (a) a magnesium supported solid complex titanium catalyst and (b) an organometallic compounds of metal of Group I or III of the Periodic Table, is characterized in that an inert solvent having high viscosity with molecular weight of 300 g/mole or more is used as a reaction medium. Mineral oil is especially preferred as a reaction medium.

The magnesium supported solid titanium catalyst (a) used in the present invention may be a typical Zieglar-Natta type catalyst described in U.S. Pat. Nos. 4,482,687, 4,277372, 3,642,746, 3,642,772, 4,158,642, 4,148,756, 4,477,639, 4,518,706, 4,946,816, 4,866,022, 5,013,702, 5,124,297, 4,330,649, European Patent No. 131,832 or Japanese Patent Publication No. Sho 63-54004, etc.

A preferable example of the magnesium supported solid titanium catalyst (a) used in the present invention is a catalyst prepared by a simple and efficient preparation method, which is, comprises the following steps:

(i) preparing a solution containing magnesium by dissolving a magnesium compound having no reducibility such as magnesium halide and a Group IIIA compound of the Periodic Table into the solvent mixture of cyclic ether, one or more of alcohol, a phosphorus compound and organosilane;

(ii) precipitating solid particles by reacting said solution containing magnesium with a transition metal compound, a silicone compound, a tin compound or the mixture thereof; and then (iii) reacting said precipitated solid particles with a titanium compound and an electron donor, and then obtaining solid catalyst particles having regulated shapes after washing said reaction product with hydrocarbon solvents.

Preferable examples of the organometallic compound (b) used in the present invention include one or more compounds selected from the group consisting of trialkylaluminium such as triethylaluminium or tributylaluminium, trialkenylaluminium such as triisoprenylaluminium, partially alkoxylated alkyaluminium including dialkylaluminiumalkoxide such as diethylaluminiumethoxide or dibutyaluminiumbutoxide and alkylaluminiumsequialkoxide such as ethylaluminiumsequiethoxide or butyaluminiumsequiethoxide, partially halogenated aluminium including alkylaluminiumdihalide such as ethylalumniumdichloride, propylaluminiumdichloride or butylaluminiumbromide, dialkyaluminiumhydride such as diethylaluminiumhydride or dibutylaluminiumhydride and partially alkoxylated halogenated alkylaluminium such as ethylaluminiumethoxychloride, butylaluminiumbutoxychloride or ethylaluminiumethoxybromide, more preferably, trialkylaluminium.

An inert solvent with comparably low viscosity such as hexane, heptane and kerocene is typically used as a reaction medium when the prepolymerization is conducted in the liquid state, but in the present invention an inert solvent, especially with molecular weight of 300 g/mole or more and comparably high viscosity is used as a reaction medium, thus the phenomenon in which prepolymers precipitate after the completion of prepolymerization can be suppressed. The viscosity range of the inert solvent used in the present invention is desirably 50 to 100 cst (centistokes) at 40° C.

Further, in the present invention, when the prepolymer is fed into the reaction vessel, it is uniformly mixed with grease having high viscosity with appropriate ratio so that the prepolymers could not precipitate even in the long-term storage, and then said uniformly mixed mixture with high viscosity is uniformly fed into the reaction vessel by using a metering pump appropriate for fluid with high viscosity. Thus, the abnormal feeding into the reaction vessel can be avoided, then reaction uniformity can be improved, and also the prepolymers can be uniformly distributed without being precipitated.

For the prepolymerization in the liquid state according to the present invention, a desirable ratio of the solid complex titanium catalyst (a) is titanium atom of about 5 to 500 mmole, preferably about 10 to 100 mmole on the basis of 1 liter of the inert solvent, a desirable ratio of organometal, especially aluminium atom, in the organometallic compound (b) component is about 0.1 to 100 moles, preferably about 0.5 to 50 moles on the basis of titanium atom of 1 mole in the catalyst (a).

The prepolymerization method of α-olefin of the present invention proceeds in the same manner as the prepolymerization method of olefin using conventional Ziegler-type catalysts. Especially, the prepolymerization is conducted in the absence of oxygen and water. In the prepolymerization of the present invention using an inert solvent with molecular weight of 300 g/mole or more and high viscosity as a reaction medium, the reaction conditions should be selected after considering the liquid viscosity of said inert solvent and the solubility of α-olefins to the reaction medium, etc. The prepolymerization temperature is preferably about 10 to 100° C., more preferably about 30 to 80° C. Pressure is preferably about 50 atm or less, more preferably about 0.1 to 10 atm. The time for the prepolymerization is determined after considering the desirable degree of the prepolymerization, catalyst activity and solubility of α-olefins, etc., preferably, 30 minutes to 5 hours.

According to the α-olefin prepolymerization method of the present invention, the concentration uniformity and feeding stability of the slurry of a catalyst with a large diameter of 100 μm or more and, thereby the polymerization stability of the polymerization reaction and quality uniformity of the final product may be improved.

BEST MODE FOR CARRYING OUT THE INVENTION

Figure 1:
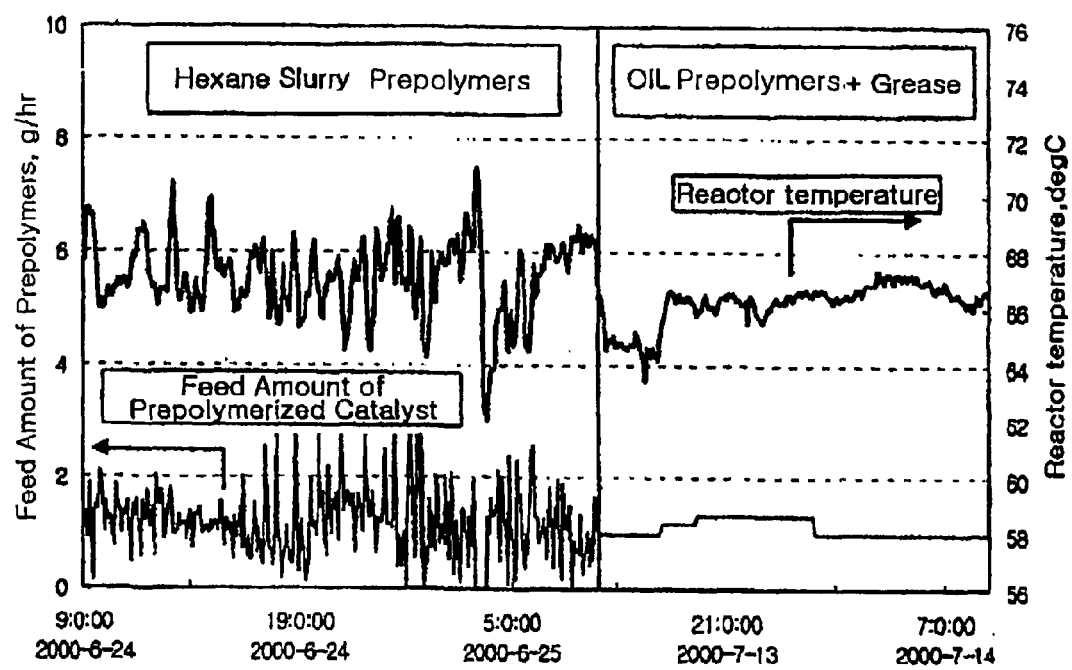
FIG. 1 shows the feed uniformity and the change in temperature of the reactor according to one preferred example of the α-olefin prepolymerization method of the present invention.

The present invention is described in detail according to the examples and comparative examples, but the scope of the present invention is not limited by these examples and comparative examples.

EXAMPLE 1

Prior to the prepolymerization, mineral oil to be used herein was added to a flask, and heated to 100° C. while it was agitated for 12 hours or more in a nitrogen atmosphere in order to remove moistures contained in the mineral oil. A 4-liter polymerization reactor equipped with a mechanical agitator and a cooling/heating jacket was prepared into the nitrogen atmospheric condition, and then 1,300 ml of mineral oil as a reaction medium, 100 g of titanium catalyst and 150 mmol of triethylaluminium were fed into the reactor in sequence. The reaction temperature was raised to 40° C. while the reaction medium was agitated at 350 rpm. After the reaction medium was agitated for about 30 minutes, propylene was fed thereto. The prepolymerization was conducted, while the reaction temperature was maintained at 40° C. and the propylene was fed in at the flow rate of 2 g/min for 2.5 hours.

EXAMPLE 2

The precipitation level was compared with respect to three types of slurries as follows:

Sample 1: Prepolymer slurry in oil prepared in Example 1+grease (oil/grease=2/1 weight ratio).

Sample 2: Prepolymer slurry in oil prepared in Example 1+grease (oil/grease=3/1 weight ratio).

Sample 3: (comparative example) Prepolymer slurry in hexane.

(1) For the above three samples, the degree of prepolymerization was 3 (g-PP/g-catalyst), and the concentration was 20 weight percent.

(2) The above three samples were respectively added into a glass bottle with 7 cm of diameter to 100 mm height while the samples were uniformly agitated.

(3) Each of the bottles containing the slurry samples was uniformly mixed, and then the precipitation depth was measured as a function according to the time after it was left in a vessel at 0° C.

TABLE 1

Comparison of precipitation depth by types of solvents and as a function to the time (unit: mm)

| Standing Time | Sample 1 (Example) | Sample 2 (Example) | Sample 3 (Comparative Example) |
|---|---|---|---|
| 1 min | 0 | 0 | 60 |
| 5 min | 0 | 0 | 75 |
| 1 day | 0 | 0 | 80 |
| 5 days | 1 | 1.5 | 80 |

Table 1 shows that there was no precipitation until 5 days when the prepolymer slurry in oil and grease were mixed, but most of the prepolymer slurry in the hexane slurry was precipitated within 5 minutes.

EXAMPLE 3

The feeding stability in a continuous polypropylene polymerization reactor in a pilot scale was compared with those of the prepolymer prepared in the same manner as the composition of the prepolymer slurry in oil+grease mixture (oil/grease=2/1 weight ratio) experimented in the above EXAMPLE 2 and the prepolymer slurry in hexane.

<Polymerization Conditions and Procedures>

(1) 30 kg of liquid propylene was added to a 150 Liter polymerization reactor equipped with an agitator.

(2) The reaction temperature was controlled to 67° C., and hydrogen was fed thereto until the pressure rose to 30 kg/cm².

(3) The prepolymer was fed at the amount of 1 g-titanium per 1 hour, and the triethylaluminium was continuously fed thereto until the ratio of aluminium to titanium atom (g-aluminium/g-titanium) became 4, and also the Si-type electron donor was continuously fed thereto until the ratio of silicone to titanium atom (g-silicone/g-titanium) became 3.5.

(4) The prepolymer slurry in oil+grease mixture was fed into the reactor by using a piston-type pump, and the prepolymer slurry in hexane was fed into the reactor by using a reciprocating metering pump.

(5) The feeding uniformity and the change in temperature of the reactor in the two above cases were measured, and the results are shown in FIG. 1.

FIG. 1 shows that the feeding rate was not uniform and thereby the reaction temperature severely fluctuated in the case of feeding the prepolymer slurry in hexane into the reactor, while the feeding rate was uniform and thereby the reaction temperature was relatively uniform in the case of feeding the prepolymer slurry in oil plus grease into the reactor.

In conclusion, the phenomena, in which the prepolymers become precipitated after the completion of prepolymerization, was reflectively suppressed, and thereby the abnormal feeding was prevented, and the uniformity of the reaction was improved by using the prepolymerization method according to the present invention.

What is claimed is:

1. A method of prepolymerizing an α-olefin comprising:
   contacting an α-olefin with a catalyst system, wherein the catalyst system comprises:
   a magnesium supported solid complex titanium catalyst; and an organometallic compound of metal of Group I or II of the Periodic Table, wherein an inert solvent is used as a reaction medium, and wherein the inert solvent comprises mineral oil, and wherein the inert solvent has a molecular weight of 300 g/mole or more, and wherein the viscosity of the inert solvent is about 50 to about 100 centistokes at 40° C.

2. The method of claim 1, wherein said organometallic compound is trialkylalunuinium.

3. The method of claim 1, wherein the ratio of said solid complex titanium catalyst (a) to the inert solvent is 5 to 500 millimoles of titanium atoms per one liter of the inert solvent, and the ratio of organometals in the organometallic compound (b) component to the catalyst (a) is 0.1 to 100 moles per one mole of titanium atoms in the catalyst (a).

4. The method of claim 1, wherein the magnesium supported solid complex titanium catalyst comprises a Zieglar-Natta catalyst.

5. The method of claim 1, wherein the magnesium supported solid complex titanium catalyst is prepared by a method comprising:

preparing a solution containing magnesium by dissolving a magnesium compound and a Group IIIA compound of the Periodic Table in a solvent mixture of cyclic ether, one or more of alcohol, a phosphorus compound and organosilane;

precipitating solid particles by reacting the solution containing magnesium with a transition metal compound, a silicone compound, or a tin compound;

reacting said precipitated solid particles with a titanium compound and an electron donor; and washing the reaction product with hydrocarbon solvents to obtain solid catalyst particles.

6. The method of claim 1, wherein the catalyst system comprises particles with a diameter of 100 μm or more.

* * * * *